(12) United States Patent
Synnestvedt

(10) Patent No.: US 8,805,980 B1
(45) Date of Patent: Aug. 12, 2014

(54) ACCOUNTING FOR POLICY ENFORCEMENT DECISIONS IN RADIUS SYSTEMS

(75) Inventor: Robert Glenn Synnestvedt, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1367 days.

(21) Appl. No.: 10/285,739

(22) Filed: Nov. 1, 2002

(51) Int. Cl.
*G06F 15/173* (2006.01)
*H04L 12/56* (2006.01)
*H04L 29/06* (2006.01)

(52) U.S. Cl.
CPC ............. *H04L 47/70* (2013.01); *H04L 63/0892* (2013.01)
USPC ........................................ 709/223; 370/230

(58) Field of Classification Search
CPC ... H04L 12/14–12/1407; H04L 47/70–47/829; H04L 63/0892
USPC ............................ 370/230–234; 709/223–229
See application file for complete search history.

(56) References Cited

U.S. PATENT DOCUMENTS

| | | | | |
|---|---|---|---|---|
| 6,119,160 | A * | 9/2000 | Zhang et al. .................. | 709/224 |
| 6,286,052 | B1 * | 9/2001 | McCloghrie et al. ......... | 709/238 |
| 6,308,328 | B1 * | 10/2001 | Bowcutt et al. ............... | 725/111 |
| 6,335,968 | B1 * | 1/2002 | Malik .......................... | 379/114.2 |
| 6,341,127 | B1 * | 1/2002 | Katsube et al. ............... | 370/352 |
| 6,405,251 | B1 * | 6/2002 | Bullard et al. ................ | 709/224 |
| 6,578,076 | B1 * | 6/2003 | Putzolu ......................... | 709/223 |
| 6,834,300 | B1 * | 12/2004 | Barna et al. ................... | 709/223 |
| 7,002,977 | B1 * | 2/2006 | Jogalekar ...................... | 370/410 |
| 7,032,022 | B1 * | 4/2006 | Shanumgam et al. ........ | 709/225 |
| 2002/0091926 | A1 * | 7/2002 | Fukutomi ..................... | 713/170 |
| 2002/0095524 | A1 * | 7/2002 | Sanghvi et al. ............... | 709/318 |
| 2002/0099776 | A1 * | 7/2002 | Cafarella et al. ............. | 709/206 |
| 2002/0160811 | A1 * | 10/2002 | Jannette et al. ............... | 455/560 |
| 2004/0071131 | A1 * | 4/2004 | Iyer et al. ...................... | 370/352 |
| 2004/0073786 | A1 * | 4/2004 | O'Neill et al. ................ | 713/155 |
| 2004/0248583 | A1 * | 12/2004 | Satt et al. ..................... | 455/452.2 |

OTHER PUBLICATIONS

Rigney, et al. "RADIUS Accounting", RFC 2866, Jun. 2000, The Internet Society.*
Rigney, et al. "Remote Authentication Dial in User Service (RADIUS)", RFC 2865, Jun. 2000, The Internet Society.*
Curtin, et al, "Tigris—A gateway between circuit-switched and IP network", 1999, Ericsson Review No. 2, pp. 70-81.*
Mitton, D. "Network Access Servers Requirements: Extended RADIUS Practices", Jul. 2000, Network Working Group, RFC 2882.*
IETF (The Internet Engineering Task Force) Network Working Group, Request for Comments: 2865, Obsoletes: 2138, Category: Standards Track, "Remote Authentication Dial in User Service (RADIUS)," (71 pages); http://www.ietf.org/rfc/rfc2865.txt.

* cited by examiner

*Primary Examiner* — Patrice Winder
*Assistant Examiner* — Julian Chang
(74) *Attorney, Agent, or Firm* — Baker Botts L.L.P.

(57) ABSTRACT

A method of accounting for policy decision in access requests is disclosed. The method includes receiving a pre-authentication request for a call and applying at least one policy to determine a policy decision for the request. At least one message is then transmitted to indicate a manner in which the call is resolved and the policy decision.

42 Claims, 3 Drawing Sheets

ACCOUNTING FOR POLICY ENFORCEMENT DECISIONS IN RADIUS SYSTEMS

BACKGROUND

1. Field

This disclosure relates to policy systems, more particularly to policy systems using Remote Access Dial-In User Services (RADIUS).

2. Background

Policy systems are typically a server or servers deployed in conjunction with a wholesale network to monitor and control traffic on the network in accordance with various policies. Policies that may impact the traffic control include service level agreements between wholesalers and their customers, and port management policies. The policy system generally enforces policies to ensure that the network is operating within pre-defined limits. At the core of policy enforcement is the establishment, enforcement and reporting of policy that affects a particular call.

RADIUS provides a means to monitor and control services across the wholesale dial, Voice over Internet Protocol (VoIP), and Any Service Any Port (ASAP) networks. The parameters and protocols for RADIUS messaging is set forth in the Internet Engineering Task Force (IETF) Request for Comments (RFC) 2865. One aspect of RADIUS is a pre-authentication request and response that allows the network to accept or reject messages prior to commitment of resources, such as by reservation. This increases network efficiency, as the resources are not committed while waiting for a policy system to accept or reject a call.

A problem that arises is when a pre-authentication request is rejected. This is generally accomplished in RADIUS using an "Access Reject" message. Under the terms of the IEFT's RFC 2865, the Access Reject message only needs to contain a text message that gives some indication of the reason for call rejection. This message is not well defined and may only be sent to the remote client that had the call rejected. This is not helpful for a policy system that has policy processors, gateways and accounting systems on separate hosts.

Similarly, there is no requirement that the RADIUS client receiving the Access Reject message as part of a pre-authentication transaction issue any form of accounting information. Remote reporting systems that should report on every call rejection have no guaranteed means to receiving accounting information for policy rejection criteria.

For calls that are accepted, there is no current way to indicate under which policies the call was accepted. Further there are no current means by which an accepted call is identified with a 'standard use' policy, or whether the call is part of an 'over-subscription' pool for which the customer is charged a premium.

SUMMARY

One embodiment of the invention comprises a method to account for policy decision in access requests is disclosed. The method includes receiving a pre-authentication request for a call and applying at least one policy to determine a policy decision for the request. A message is then transmitted to indicate a manner in which the call is resolved and the policy decision. The messages may be RADIUS Access Accept or Access Reject messages, and may include a vendor specific RADIUS attribute that accounts for policy decisions.

Another embodiment of the invention is a network device capable of transmitting the messages in such a manner as to allow for accounting of the policy decision.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
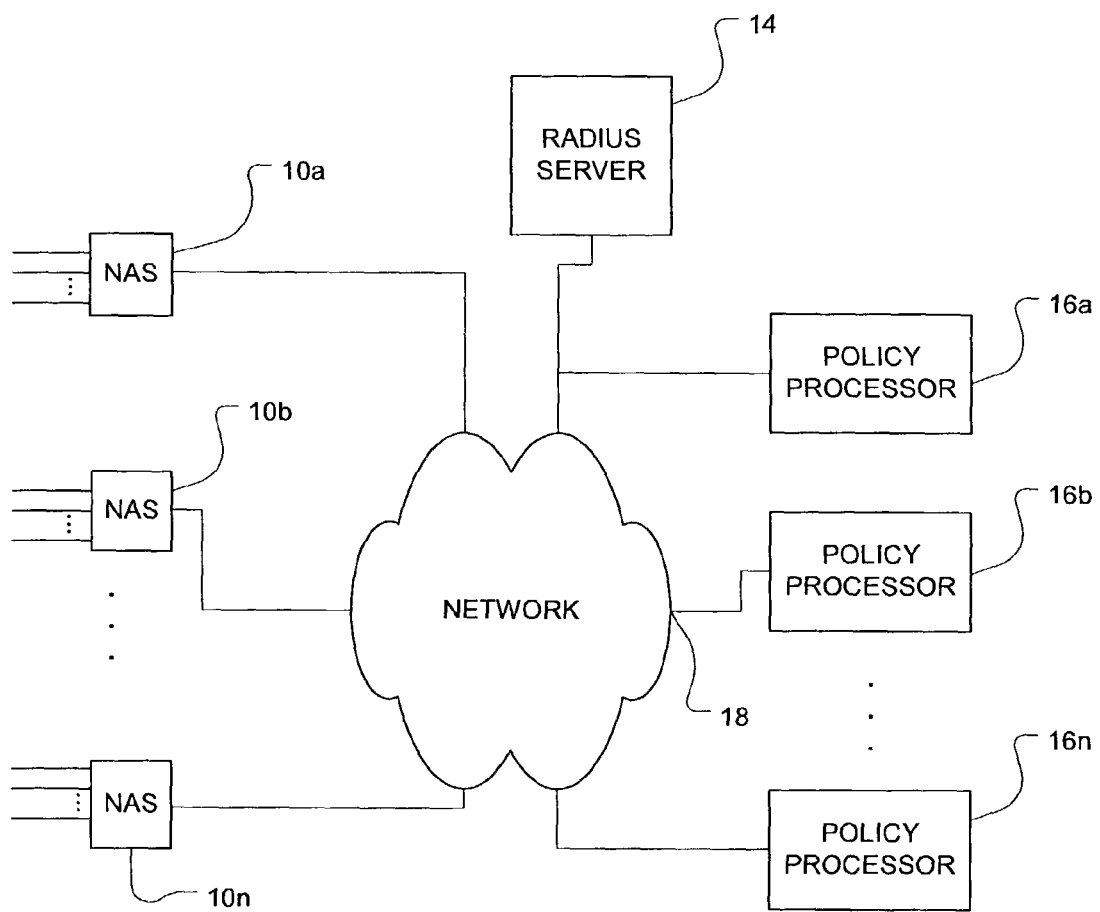
FIG. 1 shows an embodiment of a network and its associated policy processors.

FIG. 1 shows a wholesale network 18 with an associated policy system. Network Access Servers (NAS) 10a-n receive calls from users. The NASes then determine if the call can be connected to the network. Somewhere in the network lies the (RADIUS) server 14 or servers to which the user is trying to connect. A relatively new implementation of a RADIUS proxy devices, referred to as a RASER may also be used.

Several different factors affect the connection of a call. A user typically enters a user name and password, which must be verified. Similarly, the network must be able to handle the call. Typically the factors affecting the network handling of a call are directed towards traffic considerations and network capacity. If the traffic level is too high, or network resources are tied up, the call will be rejected.

Recently, however, wholesalers have begun implementing policy systems to control their networks. Policy systems, which contain one or more dedicated devices that process policy considerations and are referred to here a policy processors, make decisions to accept or reject calls based on other factors than the capabilities and capacity of the network. For example, a user dialing into the network through NAS 10a may be a user of a particular ISP, ISP1. ISP1 is a customer of the wholesaler that owns the network 18, and has an agreement, referred to here as a Service Level Agreement (SLA) that sets for the provision of service by the wholesaler to ISP1 and the associated costs.

A service level agreement may guarantee a predetermined number of users on the network for ISP1, at a set level of service. The SLA may also set forth another number of users for which there is no guaranteed level of service, but for which there will be made best efforts to connect. For example, ISP1 may have 25,000 users are a particular level of service, with a 'best-efforts' pool of 10,000 users. These numbers may also be manipulated based upon the time of day, and may be spread over a number of POPs. For example, ISP1 may be allowed 15,000 users between 6 and 8 am at the first level of service, going up or down after 8 am.

This type of agreement is implemented in the policy system as a set of constraints that are used to determine whether or not a call can be accepted. Generally, it is desirable for the results of the applications of policies to be reported and provided to the wholesaler and the customer. If, for example, ISP1 has had several users call in to their customer service center complaining that are not getting connected, ISP1 may then turn around and call the wholesaler to complain. If the wholesaler can show that the rejected calls were because they were over the SLA, then ISP1 may become aware that it needs to renegotiate the contract, or that it was just a random occurrence and will be adjusted accordingly. However, current systems have no accounting requirements for calls rejected prior to access request, those calls rejected based upon a pre-authentication request.

In the call flow for a pre-authentication request, the pre-authentication request is followed by an authentication request, followed by an accounting start and then an accounting stop. There is no place in the call flow for any accounting between pre-authentication and authentication. When a call is rejected after an authentication request, the call flow would start with the pre-authentication request, then the authentication request, followed by an accounting stop, where the accounting stop has a reject reason associated with it.

However, problems arise in the current implementations of policy services in that this information may not be recorded at all, recorded in such a way that it is cumbersome for the wholesale network reporting systems to access the information, or it may not provide enough information. For example, current policy systems may write a Call Detail Record, documenting the resolution of a call, such as accepted or rejected, and is associated accounting information. These are typically stored as local files by the servers, as there are no effective requirements on how to pass this information to other systems.

Similarly, if the call is outside the first level of service, the user may be connected as part of the 'best efforts' pool, which may also be referred to as the over-flow pool or the over subscription pool. These slots for calls are allocated on a first-come, first-serve basis and may involve a premium pricing structure, as they are 'extra' service being provided.

NAS 10a sends the request to the policy processor or processors 16a-c. The policy processor applies the appropriate policies, as will be discussed in more detail later, and either accepts or rejects the call. It must be noted that the call request in a RADIUS system is actually a pre-authentication request. A pre-authentication allows the system to determine if a call is going to be accepted prior to any resource reservations or allocations that might decrease the network efficiencies if the call were to be rejected. Making reservations and allocations, even temporarily, for calls that will not be connected reduces the amount of traffic a network can handle.

Figure 2:
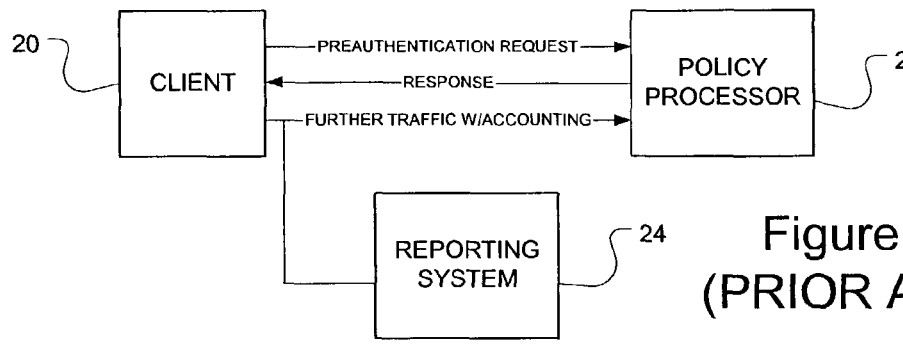
FIG. 2 shows a call flow for a pre-authentication request, according to the prior art.

As can be seen in FIG. 2, this scenario may result in a call accept or a call reject message. In RADIUS systems, as documented in IETF's RFC 2865, a pre-authentication request is granted with an Access Accept message and denied with an Access Reject message. Currently, the client 20, which may be a NAS or a gateway, sends a pre-authentication request to the policy processor 22. The policy processor then returns a response. In the case of an Access Reject message, the traffic ends there and there is no accounting required of the rejection or the reasons for the rejection.

In the case of an Access Accept message, there are some requirements that allow the accounting systems and procedures of the network to have access to the necessary information. For example, the RADIUS specification (IEFT RFC 2865) requires that an attribute, discussed in more detail below, called a Class attribute can be sent by the server, in this case the policy processor, to the client. The client is to send it unmodified to the accounting server as part of an accounting request response packet. This can be used to ensure that the accounting and reporting system 24 'knows' that the call has been accepted. This solves the problem of identifying accepted calls but is somewhat awkward in that there is no way to indicated under which policy the call was accepted, the agreed upon service level or as part of an over subscription service.

Figure 4:
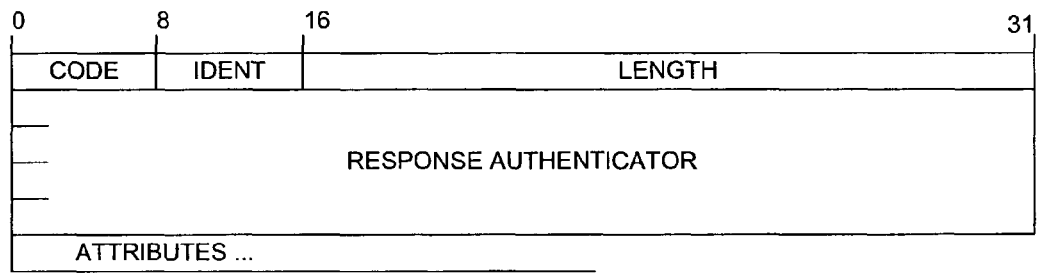
FIG. 4 shows a diagram of a RADIUS Access Accept or Access Reject message.

A more detailed view of an Access Accept or Access Reject message is shown in FIG. 4. It must be noted that these are actually two different messages and have different aspects to them. However, the overall structure of these messages is the same. The first 8 bits is the CODE field, in which the type of message is defined, such as 2 for Access Accept and 3 for Access Reject. The Identifier field is an octet that identifies the Access Request or pre-authentication request that caused the response. The length field is two octets that define how long the message is. The Response Authenticator is a calculated value that allows the system to maintain security and is beyond the scope of this disclosure. The rest of the message is Attributes. Attributes are the pieces of the message that is necessary to provide information to the other party to the transaction. Examples include user name, client ID, port ID, etc. An example of such an Attribute is the Class Attribute defined above.

Figure 5:
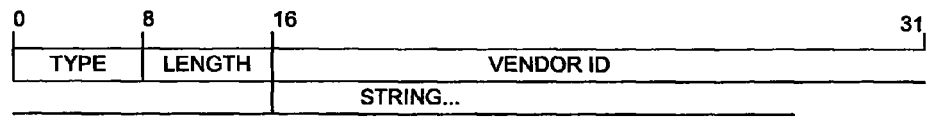
FIG. 5 shows a diagram of a RADIUS Vendor Specific Attribute.
Figure 6:
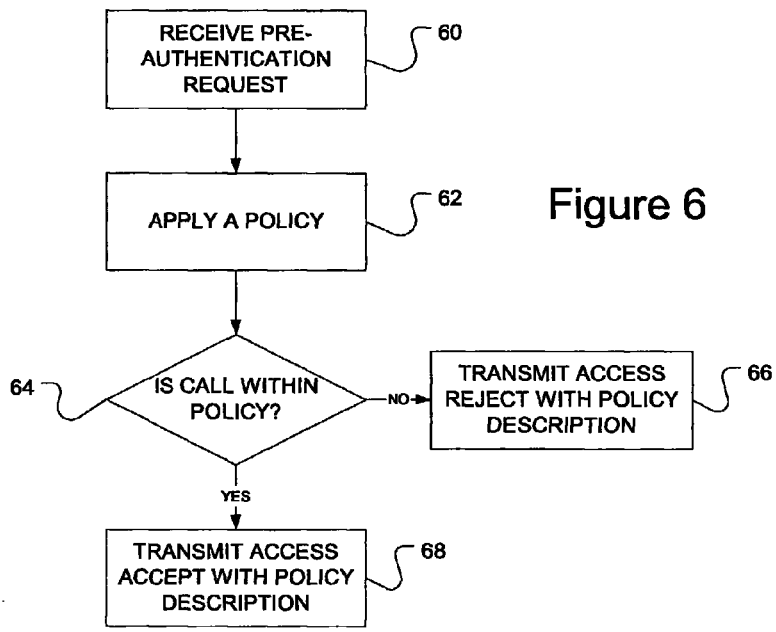
FIG. 6 shows a flowchart of an embodiment of a method to account for policy decisions in response to pre-authentication requests.

A specific Attribute that may be used is a Vendor Specific Attribute (VSA) the format of which is shown in FIG. 5, which will be referred to here as the Policy Description Attribute. It is possible to define a VSA that documents the policy under which a call was rejected or a call was accepted as an over subscription call. This VSA could take many forms. The string portion could point to a file name into which the Call Detail Record was written, allowing other portions of the policy system to access the file, or it could actually include the documented information itself, as examples. The use of such a VSA would then allow the policy system to track and report on rejected calls and over subscription calls in addition to the regularly accepted calls. Alternatively, the Policy Description could become a new RADIUS Attribute.

Figure 3:
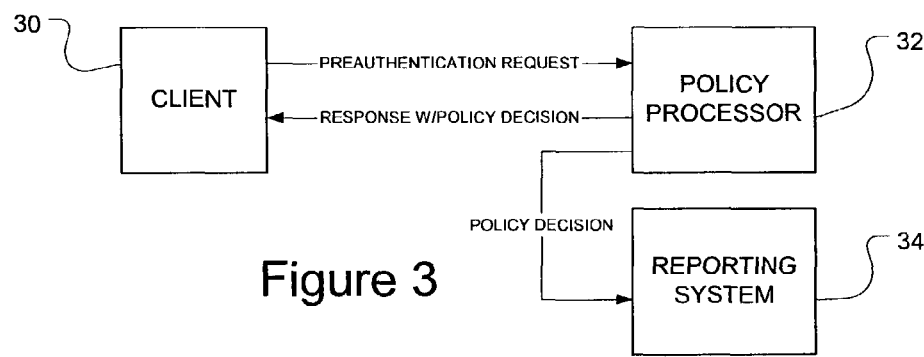
FIG. 3 shows an embodiment of a call flow for a pre-authentication request.

Referring to FIG. 3, it can be seen that the use of either a VSA or a new RADIUS Attribute of Policy Description would allow the policy processor to document the relevant policy applied and the request resolution and then require the client to return that information to the accounting and reporting system as part of the response to an accounting request. This would overcome both the problems of undocumented rejected calls as well as identifying over subscription calls that are priced differently than 'regular' calls. While this information may be supplied to the accounting system from the client, it is the policy processor that actually generates and documents that information based upon the policies applied to the request.

An embodiment of a method to account for policy decisions in response to pre-authentication requests is shown in FIG. 5. At 60 the policy processor receives a pre-authentication request from a client, which could be one of several different entities, including a NAS, a RADIUS server, a RADIUS proxy server referred to as a RASER, where the latter two entities are typically forwarding the request generated by the NAS. At 62, the policy processor applies a policy. As some policy systems are distributed, this may involve the policy processor receiving the request accessing other policy processors that have information relevant to the request, or the policy processor may be able to apply policies local to that processor.

At 64 the policy processor determines whether or not the call is within policy. Note that 'within policy' may include being outside of an SLA but within the over subscription pool.

If the call is within policy, the policy processor then transmits the Access Accept message with the Policy Decision Attribute, either a VSA or a standard RADIUS Attribute. If the call is outside of policy, the processor transmits an Access Reject message with the included Attribute such that the reporting system will receive the Reject message as well.

In actuality, there will more than likely be two response packets. The first is returned to the client making the pre-authentication request as an Access Reject or Accept. The second is either an Accounting Start or an Accounting Stop packet, depending up the acceptance or rejection of the pre-authentication request, addressed to the accounting system or the AAA (Authentication, Authorization and Accounting) server. This allows the AAA server or other accounting system to have access to the necessary information thereby allowing the wholesaler to track the impact of policy decisions on customer traffic. If the Policy Decision Attribute were to be defined as a standardized RADIUS Attribute, it could be defines similar to the Class Attribute for Access Accept messages, where the policy process would be required to provide it to the reporting system. However it is possible that in further refinements to the RADIUS service specification, one message could be sent to the two different entities in a multi-cast format.

Figure 7:
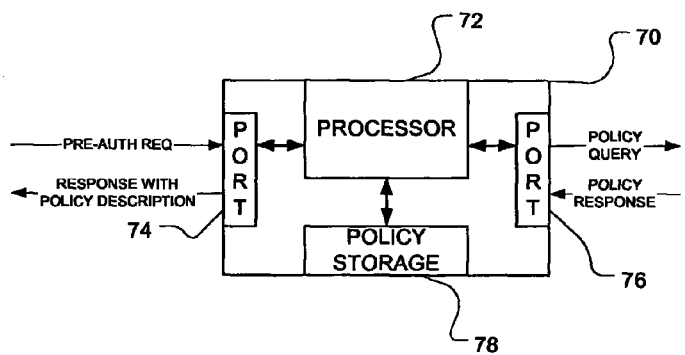
FIG. 7 shows a diagram of an embodiment of a network device.

An example of a network device capable of operating as a policy processor with the Policy Description Attribute is shown in FIG. 7. The policy processor 70 has a port 74 allowing it to receive pre-authentication requests. It may have another port 76 that allows it to communicate with other policy processors as necessary, as discussed above. The processor 72 applies the relevant policies and transmits the requisite response with the Policy Description attribute. A memory 78 would act as the storage for the various parameters associated with a customer, such as a call limit, an oversubscription limit, etc.

As policy processors are currently resident on wholesale systems that have policy systems, the implementation of embodiments of the invention could be the form of executable code contained on an article of machine-readable media. The code, when executed, would cause the machine to perform the processes of the invention.

Thus, although there has been described to this point a particular embodiment for a method and apparatus for policy system load balancing and throttling in data networks, it is not intended that such specific references be considered as limitations upon the scope of this invention except in-so-far as set forth in the following claims.

What is claimed is:

1. A method of accounting for policy decision in access requests in a network, the method comprising:
   receiving a pre-authentication request from a client for a call at a policy server, wherein the pre-authentication request allows the network to determine if a call is to be granted prior to allocating any resources to the call;
   applying at least one policy at the policy server to determine a policy decision for the request, wherein the policy decision is based upon other factors than capabilities and capacity of the network;
   transmitting at least one reject message to an accounting system configured to track rejections associated with the policy and to the client making the pre-authentication request if the call is outside the policy, wherein the reject message includes a policy identifier identifying the policy applied to the pre-authentication request;
   transmitting at least one accept message to the accounting system and to the client making the pre-authentication request if the call is within policy, wherein the accept message includes the policy identifier to allow the accounting system to track acceptances associated with the policy;
   requiring the client to transmit the reject message to the accounting system if the call is outside the policy; and
   requiring the client to transmit the accept message to the accounting system if the call is within policy.

2. The method of claim 1, wherein the at least one policy further comprises a service level agreement.

3. The method of claim 1, wherein the at least one policy further comprises a port policy.

4. The method of claim 1, wherein the policy decision further indicates that the call was accepted under an over subscription service policy.

5. The method of claim 4, wherein the at least one accept message further comprises a Remote Authentication Dial In User Service Access Accept sent to a requesting client and a message sent to a reporting system including a Policy Decision Attribute.

6. The method of claim 1, wherein the policy decision further comprises a decision rejecting the call under both of a standard use policy and an over subscription service policy.

7. The method of claim 6, wherein the at least one reject message further comprises a Remote Authentication Dial In User Service Access Reject message sent to a requesting client and a message sent to a reporting system including a Policy Decision Attribute.

8. The method of claim 1, wherein at least one of the accept message and the reject message further comprises a Remote Authentication Dial In User Service policy description vendor specific attribute.

9. The method of claim 1, wherein at least one of the accept message and the reject message further comprises a Remote Authentication Dial In User Service Policy Description Attribute.

10. A network device, comprising:
    a port to allow reception of a pre-authentication request from a client, wherein the pre-authentication request allows the network to determine if a call is to be granted prior to allocating any resources to the call; and
    a processor to:
      apply at least one policy to the request, wherein the policy decision is based upon other factors than capabilities and capacity of the network;
      generate at least one message indicating a policy decision;
      transmit at least one reject message to an accounting system and to the client making the pre-authentication request, if the call is outside the policy, wherein the reject message includes a policy identifier to allow the accounting system to track rejections associated with the policy;
      transmit at least one accept message to an accounting system and to the client making the pre-authentication request, if the call is within policy, wherein the accept message includes a policy identifier to allow the accounting system to track acceptances associated with the policy;
      require the client to transmit the reject message to the accounting system if the call is outside the policy; and
      require the client to transmit the accept message to the accounting system if the call is within policy.

11. The network device of claim 10, wherein the network device is a server that has been designated as a policy processor.

12. The network device of claim 11, wherein the policy processor further comprises a service level agreement server.

13. The network device of claim 11, wherein the policy processor further comprises a port policy server.

14. The network device of claim 10, wherein the network device applies more than one policy.

15. The network device of claim 10, wherein the network device further comprises storage to store parameters associated with a policy.

16. An article of machine-readable media containing executable code that, when executed causes the machine to:
receive a pre-authentication request from a client for a call, wherein the pre-authentication request allows the network to determine if a call is to be granted prior to allocating any resources to the call;
apply at least one policy to determine a policy decision from the request, wherein the policy decision is based upon other factors than capabilities and capacity of the network;
transmit at least one reject message to an accounting system configured to track rejection associated with the policy and to the client making the pre-authentication request if the call is outside the policy, wherein the reject message includes a policy identifier identifying the policy applied to the pre-authentication request;
transmit at least one accept message to the accounting system and to the client making the pre-authentication request if the call is within the policy, wherein the accept message includes the policy identifier to allow the accounting system to track acceptances associated with the policy;
require the client to transmit the reject message to the accounting system if the call is outside the policy; and
require the client to transmit the accept message to the accounting system if the call is within policy.

17. The article of claim 16, wherein the code further causes the machine to accept the call.

18. The article of claim 17, wherein the code causing the machine to transmit at least one message further causes the machine to transmit a Remote Authentication Dial in User Service Access Accept and a message with a Policy Decision Attribute to a reporting system.

19. The article of claim 16, wherein the code further causes the machine to reject the call.

20. The article of claim 17, wherein the code causing the machine to transmit at least one reject message further causes the machine to transmit a Remote Authentication Dial In User Service Access Reject message and a message with a Policy Decision Attribute to a reporting system.

21. A network device, comprising:
a means for allowing reception of a pre-authentication request from a client at a policy server, wherein the pre-authentication request allows the network to determine if a call is to be granted prior to allocating any resources to the call;
a means for applying at least one policy to determine a policy decision for the request, wherein the policy decision is based upon other factors than capabilities and capacity of the network;
a means for generating at least one reject message indicating the policy decision if the call is outside the policy, wherein the reject message includes a policy identifier identifying the policy applied to the request; and
a means for generating at least one accept message if the call is within policy, wherein the accept message includes the policy identifier;
a means for transmitting the accept message and the reject message to an accounting system configured to track acceptances and rejections associated with the policy and to the client making the pre-authentication request;
a means for requiring the client to transmit the reject message to the accounting system if the call is outside the policy; and
a means for requiring the client to transmit the accept message to the accounting system if the call is within policy.

22. The network device of claim 21, wherein the network device further comprises a server that has been designated as a policy processor.

23. The network device of claim 22, wherein the policy processor further comprises a service legal agreement server.

24. The network device of claim 22, wherein the policy processor further comprises a port policy server.

25. The network device of claim 21, wherein the network device applies more than one policy.

26. The network device of claim 21, wherein the means for applying the means for generating and the means for transmitting further comprise the same means.

27. A method of accounting in a network, the method comprising:
generating a pre-authentication request for a call at a client;
transmitting the pre-authentication request to a policy server; applying at least one policy at the policy server to determine a policy decision for the request, wherein the policy decision is based upon factors other than the capabilities and capacity of the network;
transmitting at least one reject message to an accounting system and to the client generating the pre-authentication request, if the call is outside the policy, wherein the reject message includes a policy identifier to allow the accounting system to track rejections associated with the policy;
transmitting at least one accept message to the accounting system and to the client making the pre-authentication request, if the call is within policy, wherein the accept message includes a policy identifier to allow the accounting system to track acceptances associated with the policy and network resources are allocated to a call only if the accept message is transmitted;
requiring the client to transmit the reject message to the accounting system if the call is outside the policy; and
requiring the client to transmit the accept message to the accounting system if the call is within policy.

28. The method of claim 27, wherein the at least one policy further comprises a service level agreement.

29. The method of claim 27, wherein the pre-authentication request comprises a user name and a password.

30. The method of claim 27, wherein the accept message or the reject message is sent immediately following applying the policy.

31. The method of claim 27, wherein applying at least one policy comprises:
applying a first policy comprising a guaranteed level of service; and
applying a second policy.

32. The method of claim 31, wherein the second policy comprises an over subscription service policy.

33. The method of claim 32, wherein the accept message comprises a type identifier indicating that the over subscription service policy was applied.

34. The method of claim 27, wherein applying at least one policy comprises accessing other policy processors.

35. A network system, comprising: a client to generate a pre-authentication request for a call;

an accounting system configured to track acceptances and rejections associated with individual policies; and a first policy processor, the first policy processor comprising:

a processor to:

apply at least one policy to the request to generate a policy decision, wherein the policy decision is based upon factors other than the capabilities and capacity of the network and wherein the policy decision indicates whether the call is accepted or rejected;

transmit at least one reject message to the client if the policy decision indicates the call is rejected, wherein the reject message includes a reason for rejection;

require the client to transmit the reject message to the accounting system if the call is outside the policy;

transmit at least one accounting stop message to the accounting system if the policy decision indicates the call is rejected, wherein the accounting stop message includes a policy identifier identifying the policy applied to the request and the reason for rejection to allow the accounting system to track rejections associated with the policy;

transmit at least one accept message to the client if the policy decision indicates the call is accepted;

require the client to transmit the accept message to the accounting system if the call is within policy; and transmit at least one accounting start message to the accounting system if the policy decision indicates the call is accepted, wherein the accounting start message includes a policy identifier identifying the policy under which the request was accepted to allow the accounting system to track acceptances associated with the policy, wherein network resources are not committed to the call until the accept message is transmitted.

36. The system of claim 35, wherein the policy processor further comprises:

a port to allow reception of the pre-authentication request; and a memory to store parameters associated with a customer.

37. The system of claim 35, further comprising a second policy processor in communication with the first policy processor, wherein the second policy processor has information relevant to the pre-authentication request.

38. The system of claim 37, wherein the first policy processor further comprises:

a first port to allow reception of the pre-authentication request;

a second port for communicating with the second policy processor; and a memory to store parameters associated with a customer.

39. The system of claim 35, wherein the at least one policy comprises:

a first policy comprising a guaranteed level of service; and a second policy comprising an over subscription service policy.

40. The system of claim 39, wherein the accounting start message comprises an attribute indicating whether the second policy was applied to the pre-authentication request.

41. The system of claim 35, wherein the accept message is a RADIUS Access Accept message and the reject message is a RADIUS Access Rejected message.

42. The system of claim 41, wherein the RADIUS Access Accept message and the RADIUS Access Reject message include a vendor specific RADIUS attribute that accounts for policy decisions.

* * * * *